(12) United States Patent
Witzigreuter et al.

(10) Patent No.: US 6,361,294 B1
(45) Date of Patent: Mar. 26, 2002

(54) VENTILATION SYSTEM FOR AN ENCLOSURE

(75) Inventors: John D. Witzigreuter, Kennesaw; Gary E. Gray, Marietta; Christopher S. Pedicini, Roswell, all of GA (US)

(73) Assignee: Air Energy Resources Inc., Smyrna, GA (US)

( * ) Notice: Subject to any disclaimer, the term of this patent is extended or adjusted under 35 U.S.C. 154(b) by 0 days.

(21) Appl. No.: 09/256,815

(22) Filed: Feb. 24, 1999

Related U.S. Application Data (63) Continuation-in-part of application No. 08/556,613, filed on Nov. 13, 1995, now Pat. No. 5,919,582, which is a continuation-in-part of application No. 08/544,707, filed on Oct. 18, 1995, now Pat. No. 5,691,074.

(51) Int. Cl.[7] .......................... F04B 17/00; H01M 12/08
(52) U.S. Cl. .......................... 417/413.3; 429/71; 429/83
(58) Field of Search ..................... 417/413.2, 413.3, 417/322; 429/71, 83

(56) References Cited

U.S. PATENT DOCUMENTS

| | | | |
|---|---|---|---|
| 4,262,062 A | 4/1981 | Zatsky | |
| 4,648,807 A | 3/1987 | Tippetts et al. | |
| 4,911,616 A | * 3/1990 | Laumann, Jr. | ............... 417/413 |
| 4,938,742 A | 7/1990 | Smits | |
| 4,943,750 A | 7/1990 | Howe et al. | |
| 5,085,562 A | 2/1992 | van Lintel | |
| 5,258,239 A | 11/1993 | Kobayashi | |
| 5,304,431 A | 4/1994 | Schumm, Jr. | |
| 5,325,880 A | 7/1994 | Johnson et al. | |
| 5,356,729 A | 10/1994 | Pedicini | |
| 5,398,011 A | 3/1995 | Kimura et al. | |
| 5,417,235 A | 5/1995 | Wise et al. | |
| 5,466,932 A | 11/1995 | Young et al.. | |
| 5,486,429 A | 1/1996 | Thibault | |
| 5,529,465 A | * 6/1996 | Zengerle et al. | ......... 417/413.2 |
| 5,554,452 A | 9/1996 | Delmolino et al. | |
| 5,560,999 A | 10/1996 | Pedicini et al. | |
| 5,691,074 A | 11/1997 | Pedicini | |
| 5,759,014 A | 6/1998 | Van Lintel | |
| 5,778,513 A | 7/1998 | Miu et al. | |
| 5,861,703 A | 1/1999 | Losinski | |
| 5,914,507 A | 6/1999 | Polla et al. | |
| 5,919,582 A | 7/1999 | Pedicini et al. | |
| 6,033,191 A | 3/2000 | Kamper et al. | |
| 6,109,889 A | * 8/2000 | Zengerle et al. | ......... 417/413.2 |

FOREIGN PATENT DOCUMENTS

JP        10-148181        6/1996

OTHER PUBLICATIONS

"Overview of Microelectromechanical Systems, Microactuation Methods (those more commonly in use)," Mehran Mehregany, Case Western Reserve University, Cleveland, Ohio, Copyright 1992.

* cited by examiner

*Primary Examiner*—Harold Joyce
(74) *Attorney, Agent, or Firm*—Alston & Bird LLP (57) ABSTRACT

A ventilation system having a micromachine air mover for a metal-air battery. The metal-air battery has a housing for enclosing at least one metal-air cell. The housing isolates the metal-air cell from the ambient atmosphere except for a pair of diffusion tubes. The micromachine air mover is an air pump that generates air flow by actuating a diaphragm which causes the diaphragm to vibrate. As a result of the vibration of the diaphragm, the pressure within the micromachine air mover's pump chamber varies and directional air flow is created through the housing and across the metal-air cell. When the micromachine air mover is not operating, the diffusion tubes provide a barrier to prevent diffusion of air through the housing.

19 Claims, 8 Drawing Sheets

VENTILATION SYSTEM FOR AN ENCLOSURE

RELATED APPLICATIONS

This application is a continuation-in-part of application Ser. No. 08/556,613, entitled "Diffusion Controlled Air Vent and Recirculation Air Manager for a Metal-Air Battery," filed Nov. 13, 1995, and issued as U.S. Pat. No. 5,919,582 on Jul. 6, 1999, which is a continuation-in-part of application Ser. No. 08/544,707, entitled "Diffusion Controlled Air Vent for a Metal-Air Battery," filed Oct. 18, 1995 and issued as U.S. Pat. No. 5,691,074 on Nov. 25, 1997.

TECHNICAL FIELD

The present invention relates generally to batteries, and more particularly relates to a ventilation system and air manager system for a metal-air battery.

BACKGROUND OF THE INVENTION

Metal-air battery cells include an air permeable cathode and a metallic anode separated by an aqueous electrolyte. During discharge of a metal-air battery, such as a zinc-air battery, oxygen from the ambient air is converted at the cathode to hydroxide, zinc is oxidized at the anode by the hydroxide, and water and electrons are released to provide electrical energy. Metal-air batteries have a relatively high energy density because the cathode utilizes oxygen from ambient air as a reactant in the electrochemical reaction rather than a heavier material such as a metal or metallic composition. Metal-air battery cells are often arranged in multiple cell battery packs within a common housing to provide a sufficient amount of power output. The result is a relatively light-weight battery.

To operate a metal-air battery cell, it is necessary therefore to provide a supply of oxygen to the air cathodes of the cells. Some prior systems sweep a continuous flow of new ambient air across the air cathodes at a flow rate sufficient to achieve the desired power output. Such an arrangement is shown in U.S. Pat. No. 4,913,983 to Cheiky. Cheiky uses a fan within the battery housing to supply a flow of ambient air to a pack of metal-air battery cells. When the battery is turned on, an air inlet and an air outlet are opened and the fan is activated to create the flow of air into, through, and out of the housing. U.S. Pat. Nos. 5,569,551 and 5,641,588 are incorporated herein by reference.

One problem with a metal-air battery is that the ambient humidity level can cause the battery to fail. Equilibrium vapor pressure of the metal-air battery results in an equilibrium relative humidity that is typically about 45 percent. If the ambient humidity is greater than the equilibrium humidity within the battery housing, the battery will absorb water from the air through the cathode and fail due to a condition called flooding. Flooding may cause the battery to burst. If the ambient humidity is less than the equilibrium humidity within the battery housing, the metal-air battery will release water vapor from the electrolyte through the air cathode and fail due to drying out. The art, therefore, has recognized that an ambient air humidity level differing from the humidity level within the battery housing will create a net transfer of water into or out of the battery. These problems are particularly of concern when the battery is not in use, because the humidity tends to either seep into or out of the battery housing over an extended period of time.

Another problem associated with metal-air batteries is the transfer of carbon dioxide from ambient air into the battery cell. Carbon dioxide tends to neutralize the electrolyte, such as potassium hydroxide. In the past, carbon dioxide absorbing layers have been placed against the exterior cathode surface to trap carbon dioxide. An example of such a system is shown in U.S. Pat. No. 4,054,725.

Maintaining a battery cell with proper levels of humidity and excluding carbon dioxide has generally required a sealed battery housing. As discussed above, however, prior art systems such as that disclosed by Cheiky, have used a fan of some sort to force ambient air through the battery housing during use. Large openings are provided to permit the in-flow and out-flow of air. These openings are generally sealed during non-use by a mechanical air door. If the air door is not present or not shut during non-use, large amounts of ambient air would seep into the housing. This flow of air would cause the humidity and carbon dioxide problems within the housing as discussed above. The oxygen in the ambient air also would cause the cell to discharge, thereby leading to "leakage" current and a reduction in cell efficiency and lifetime.

Even with the use of air doors, however, a certain amount of oxygen and contaminates tend to seep into the cell during non-use. Some leakage current is therefore inevitable. Although the air doors limit this leakage current and the other problems discussed above, the use of the air doors increases the complexity of the battery housing itself and increases the cost and time of manufacture of the overall battery.

Air doors have not been needed in some applications of metal-air cells, such as shown in include U.S. Pat. 4,118,544 to Przybyla. Przybyla describes a primary metal-air button cell used with watches and hearing aids. Such cells operate during a single, continuous discharge at very low current levels. In essence, Przybyla relies upon the use of continuous "leakage current" to power devices with very low current demands.

Metal-air cells typically are designed to have a relatively large air electrode surface, so that as large a power output as possible can be obtained from a cell of a given volume and weight. Once air is ventilated into a metal-air battery housing, a goal has been to distribute the oxygen-bearing air uniformly and efficiently to all air electrode surfaces. Recirculation air managers including fans within the battery housing have been developed to distribute air within the housing while keeping the volume of make-up air as low as practicable. However, in multiple cell systems, air distribution paths typically have extended from a fan, positioned along a periphery of the housing adjacent to an air door, for a lengthy distance over all of the air electrode surfaces. An example is shown in U.S. Pat. No. 5,387,477. Oxygen is depleted from the air stream so that oxygen concentration at the end of the distribution path often has fallen below a level desired for optimal power production from all the cells. Known systems that solve this problem by blowing outside air over the cells and exhausting it immediately without recirculation are subject to the flooding or drying out problems described above.

Thus, there has been a need for a practical air manager system for a metal-air battery without mechanical air doors or other mechanical sealing methods to prevent diffusion therethrough when the battery is not in use. The system should maintain a stable water vapor equilibrium across the air cathode of a metal-air cell while convectively providing new oxygen for operation of the cell at desired power levels in a simplified battery housing. There also has been a need for an air distribution system within a metal-air battery housing that minimizes the length of the air distribution path to the air electrode surfaces and minimizes the variation of the concentration of oxygen in the distributed air for all cells.

SUMMARY OF THE INVENTION

The present invention provides a ventilation system for a metal-air battery having a housing for enclosing at least one metal-air cell. The housing has at least one air inlet opening and at least one air outlet opening. A fan is positioned to force air into the air inlet opening and out of the air outlet opening when the fan is turned on. The openings are sized with a length in the direction through the thickness of the housing being greater than a width in the direction perpendicular to the thickness of the housing. The openings are unobstructed and are sized to eliminate substantially the air flow into the air inlet opening and out of the air outlet opening when the fan is turned off.

More particularly, the present invention provides a ventilation system for a metal-air battery having a preferred output current density with the fan on of about 50 to 200 ma per square inch of air cathode surface. Each opening preferably has a length to width ratio where the length is greater than about twice the width, with each opening having a length of about 0.3 to 1.5 inches and a width of about 0.03 to 0.3 inches. The openings are preferably sized in the aggregate to permit a flow rate therethrough of about 20 to 80 cubic inches per minute when forced by fan having a capacity of about 100 to 3000 cubic inches per minute.

When the fan is turned off, the openings are sized to slow the rate of diffusion therethrough such that the drain current density is less than 1 ma per square inch of air cathode surface. The preferred ratio of the output current density to the drain current density of the battery is at least 100 to 1. The flow rate with the fan off is preferably about 0.01 to 0.2 cubic inches per minute or less.

According to another aspect of the invention, a metal-air battery is provided that includes a recirculating air distribution system within a metal-air battery housing that minimizes the length of the air distribution path to the air electrode surfaces and minimizes the variation of the concentration of oxygen in the distributed air for all cells, by providing a fan within the battery housing positioned to distribute air to two separate sets of metal-air cells at the same time. In this configuration, all cells of both sets of cells receive air quickly, and the air received is of more uniform oxygen concentration because the air paths are shorter than in previous configurations utilizing the same number of cells.

In the housing of a battery embodying this aspect of the invention, a fan defines a flow axis from a negative pressure side of the fan to a positive pressure side of the fan. The battery further includes at least one ventilation opening in the housing; a plurality of metal-air cells within the housing, at least a first cell being located on a first side of the fan flow axis and at least a second cell being located on a second side of the fan flow axis; a first air path extending from the positive pressure side of the fan along an air electrode side of the first cell and to the negative side of the fan; and a second air path extending from the positive pressure side of the fan along an air electrode side of the second cell and to the negative side of the fan; the fan supplying air to both the first and second air paths at the same time.

The ventilation opening or openings utilized in this embodiment can be of the type described for the first embodiment, or of the type described in U.S. Pat. No. 5,356,729, or can be of the type utilizing an air door. Preferably, two elongate passageways are ported to each side of the fan, and have a length and diameter selected to substantially eliminate diffusion therethrough when the fan is turned off.

In another aspect of the invention, a metal-air cell is provided that includes a micromachine air mover. The micromachine air mover is a pump created from layers of etched silicon to form a three-dimensional structure with sealed cavities. The pump includes a deformable diaphragm that vibrates to generate airflow into a pump chamber. By actuating the diaphram, the pump chamber changes volume and air flow is generated across the metal-air cells.

Thus, it an object of the present invention to provide an improved ventilation system for a metal-air cell or battery.

It is a further object of the present invention to provide an improved method for supplying reactant air to a metal-air cell or battery.

It is a further object of the present invention to provide an air manager apparatus and method that maintains a more stable water vapor equilibrium across the air cathode of a metal-air cell while still providing new oxygen needed for operation of the cell at desired power levels.

It is a further object of the present invention to provide an air manager system that does not require a mechanical air door.

It is a still further object of the present invention to provide an air vent for a metal-air battery housing that substantially eliminates diffusion therein when the fan is turned off.

It is a further object of the present invention to provide a recirculating air distribution system within a metal-air battery housing that delivers oxygen-rich air to all cells in an efficient manner.

Other objects, features and advantages of the present invention will become apparent upon reviewing the following description of preferred embodiments of the invention, when taken in conjunction with the drawings and the appended claims.

DETAILED DESCRIPTION

Figure 1:
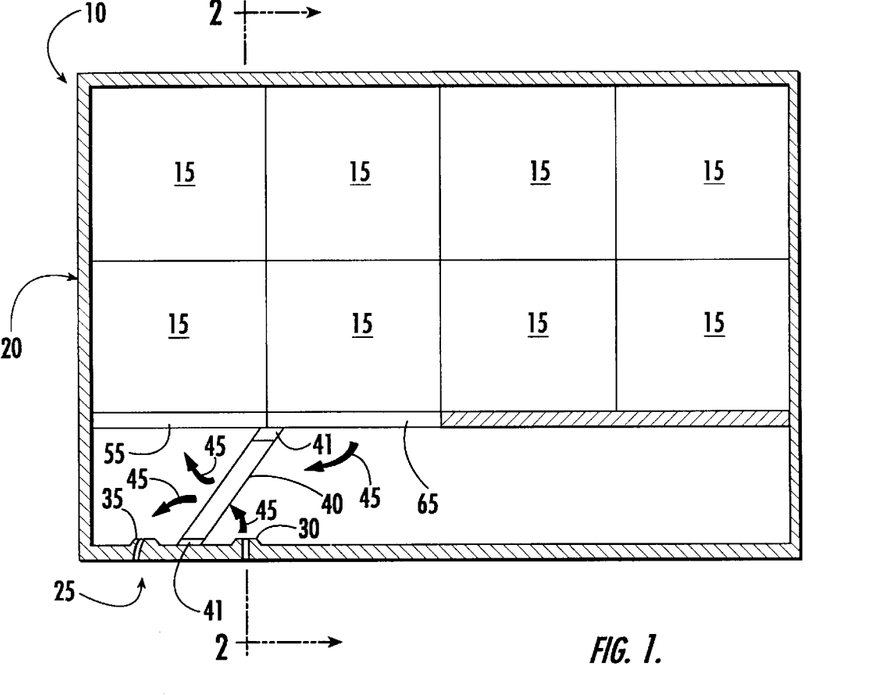
FIG. 1 is a diagrammatic top view of the battery housing embodying the present invention, showing the position of the cells, the fan, and the air openings, in combination with the direction of the flow of air with respect to the housing.
Figure 2:
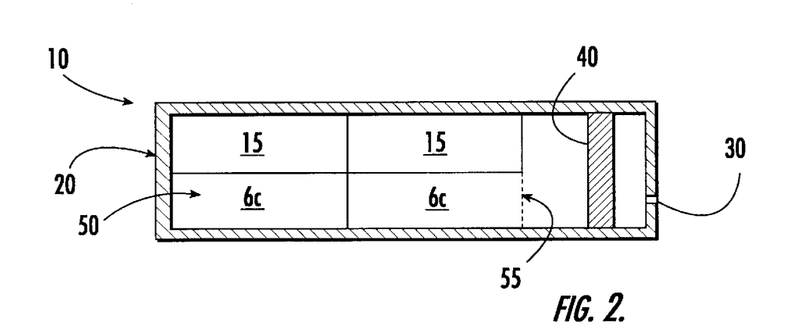
FIG. 2 is a vertical cross sectional view taken along line 2—2 of FIG. 1.

Referring now in more detail to the drawings, in which like numerals refer to like parts throughout the several views, FIGS. 1 and 2 show a metal-air battery pack 10 embodying the present invention. The metal-air battery 10 may be similar to that disclosed in commonly-owned Ser. No. 08/299,997 or in commonly owned U. S. Pat. No. 5,356,729 to Pedicini, which are incorporated herein by reference. The metal-air battery 10 includes a plurality of cells 15 enclosed within a housing 20. Although the use of the invention with a zinc-air battery is disclosed, this invention should be understood as being applicable to other types of metal-air battery cells.

The housing 20 isolates the cells 15 from the outside air with the exception of a plurality of ventilation openings 25. In the embodiment shown in FIGS. 1 and 2, a single air inlet opening 30 and a single air outlet 35 are utilized. As described below, the number of openings 25 is not as important as the aggregate size of the openings 25 in connection with the shape of each opening 25. The housing 20 may be any type of conventional, substantially air-tight structure.

A circulating fan 40 is provided for convective air flow both in and out of the housing 20 and to circulate and mix the gases within the housing 20. The arrows 45 shown in FIG. 1 represent a typical circulation of the gases into, out of, and within the housing 29 to provide reactant air to the cells 15. The capacity of the fan 40 depends upon the size of the housing 20 and the power demands of the battery 10. The term "fan 40" as used herein is intended to mean any device used to move air.

The fan 40 may be positioned within the housing 2 0 or adjacent to the housing 20 in communication with one of the openings 25. If the fan 40 is located within the housing 20, the ventilation openings 25 are positioned such that the inlet opening 30 and the outlet opening 35 are positioned on opposite sides of the fan 40. The only requirement for the positioning within the housing 20 of the fan 40 and the openings 25 is that they are in sufficiently close proximity to each other to create a convective air flow into, through, and out of the housing 20. The fan 40 may be mounted within or adjacent to the housing 20 in any convenient manner. The fan 40 is generally sealed into place by a gasket 41 or other conventional means to ensure that the low pressure and high pressure sides of the fan 40 are isolated from one another.

Figure 4:
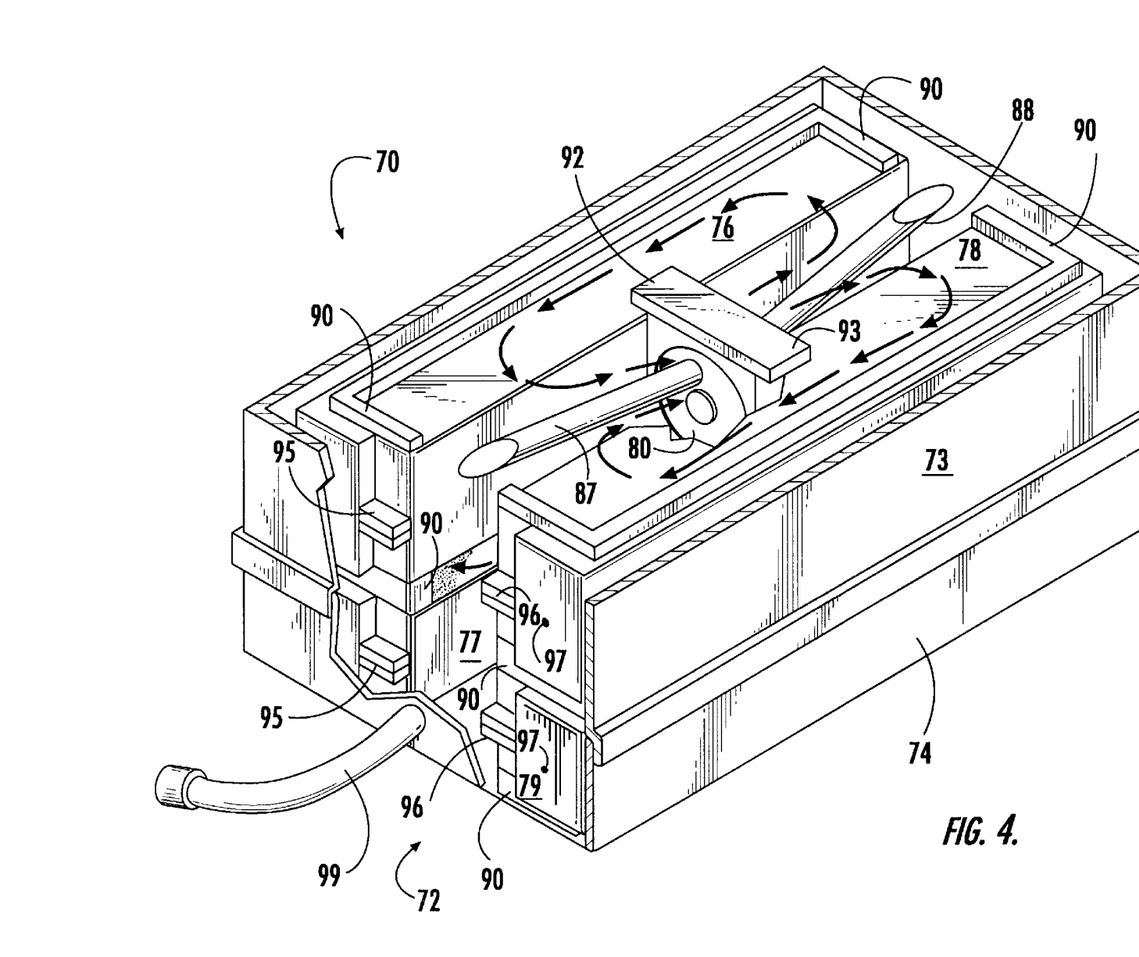
FIG. 4 is a pictorial view of a second embodiment of a battery incorporating the present invention, with portions broken away to show interior detail.

As is shown in FIG. 2, the plurality of cells 15 within housing 20 are arranged such that a reactant air plenum 50 is positioned under the cells 15. The air plenum 50 generally defines an air plenum inlet 55, an air passageway 60, and an air plenum outlet 65. The fan 40 is generally positioned between and isolates the air plenum inlet 55 from the air plenum outlet 65 for efficient air flow through the housing 20. An example of an air plenum design is shown in FIG. 4 of commonly-owned Ser. No. 08/299,997.

Figure 3:
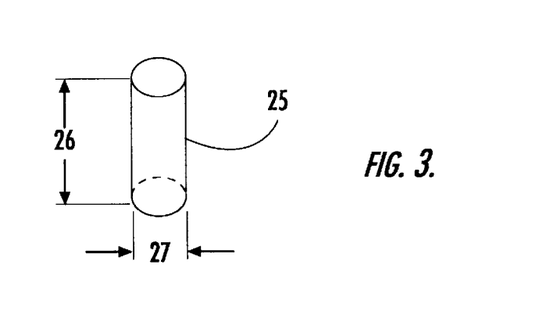
FIG. 3 is a diagrammatic pictorial view of a ventilation opening.

As is shown in FIG. 3, the ventilation openings 25 are preferably sized such that their length 26, i.e., the direction through the thickness of the housing 20, is greater than their width 27, i.e., the direction perpendicular to the thickness of the housing 20. By using a large enough ratio between the length 26 and the width 27 for the ventilation openings 25, it has been found that diffusion of air through the openings 25, without the assistance of the fan 40, is substantially eliminated. By "substantially eliminated," it is meant that the rate of diffusion of oxygen or contaminates through the openings 25 is so slow that humidity transfer or drain current is sufficiently small and has little appreciable impact on the efficiency or lifetime of the battery 10. The openings 25 are sufficiently long and narrow to provide a barrier to diffusion of gases therethrough when the fan 40 is turned off.

This required ratio between length 26 and width 27 is at least about two to one. These ratios are sufficient to prevent appreciable diffusion through the openings 25 when the fan 40 is turned off while permitting convective air flow therethrough when the fan 40 is turned on. The use of larger ratios between length 26 and width 27 is preferred. Depending upon the nature of the battery 10, the ratio can be more than 200 to 1.

The preferred total open area of the openings 25 depends upon the desired capacity of the battery 10. Any number of openings 25 can be used such that aggregate open area of all of the openings 25 equals this preferred total open area, with each such opening 25 having the same or similar ratios of length 26 to width 27 to provide the barrier functions. Although the use of circular openings 25 is disclosed, any conventional shape having the required ratios may be employed. Further, the openings 25 may be straight or curved in length.

In use, ambient air is drawn into the air inlet 30 by pull of the fan 40 when the fan 40 is turned on. As is shown by the arrows 45 in FIG. 1, the air is then drawn through the fan 40 and into the air plenum 50. The air enters the air plenum 50 through air plenum inlet 55, travels though the pathway 60 to provide a reactant air flow for the cells 15, and exits via the air plenum outlet 65. The air is then again drawn into the fan 40 where it either mixes when fresh incoming ambient air or is forced out of the housing 20 via air outlet 35. When the fan 40 is turned off, the rate of diffusion of air through the openings 25 is reduced to acceptable levels such that a mechanical air door is not required.

By way of example, in a preferred embodiment of a battery pack 10 designed to power a portable computer (not shown), an 8 volt battery 10 with 8 battery cells 15 is used (an up-converter (not shown) also may be used). Each cell 15 has an output of about 1 volt or slightly higher at about 1 to 4 amps. Each cell 15 has an exposed cathode area (not shown) of about 18 to 22 square inches for a total exposed cathode area of about 144 to 176 square inches. The battery 10 therefore has a current density of about 50 to 200 ma per square inch of cathode surface when the fan is turned on. The fan 40 has a capacity of about 100 to 3000 cubic inch per minute.

In order to pull a gas flow through the housing 20 of about 20 to 80 cubic inches per minute when the fan is turned on, the openings 25 are sized with a length 26 of about 0.3 to 1.5 inches, with about 1.0 inch preferred, and a width 27 of about 0.03 to 0.3 inches, with about 0.09 inch preferred. The total open area of each opening 25 is therefore about 0.0007 to 0.5 square inches, with a preferred ratio of length 26 to width 27 of about 10 to 1.

When the fan 40 is turned off, the gas flow rate is reduced to about 0.01 to 0.2 cubic inches per minute or less, with a leakage current of less than 1 ma. The ratio of output current density with the fan 40 turned on to drain current density with the fan 40 turned off is expected to be at least 100 to 1 in an efficient battery 10.

It is understood that the respective sizes, capacities, densities, flow rates, and other parameters discussed above are dependent upon the overall size and power requirements of the battery 10. For example, output current density could easily run in the range of 10 to 500 ma per square inch of air cathode surface area in a conventional battery 10. It is also understood that other types of electrical devices besides computer equipment may be powered by the battery 10.

The openings 25 are also preferably sized to preferentially diffuse oxygen out of the housing 20 during recharge. Oxygen is generated at the cathode (not shown) during recharge. The openings 25 are sized in the aggregate to force oxygen out of the housing 20 when the partial pressure of oxygen within the housing 20 is at a level above the partial pressure of oxygen outside the housing 25.

A second embodiment of a battery 70 embodying the present invention is shown in FIGS. 4–8. The battery 70 includes a housing 72 in two parts sealed together at a central joint: a cover portion 73 and a bottom portion 74. Within the housing 72 four cells 76–79 are positioned in two stacks of two cells each. Cells 76 and 77 form a left stack, as viewed in FIG. 7, and cells 78 and 79 form a right stack spaced apart from the left stack. A fan 80 is positioned in the elongate space between the left and right stacks. The fan is oriented to direct air along the space between the stacks, as shown by the arrows in FIG. 6, from a negative pressure side 81 of the fan 80 to a positive pressure side 82. The direction of air flow through the fan is referred to herein as the flow axis of the fan 80. Thus, the left stack, cells 76 and 77, are located on the left side of the flow axis, and the right stack, cells 78 and 79, are located on the opposite side of the flow axis. The fan 80 preferably is located approximately midway along the length of the cells, and the spaces between the fan and the cover 73 and bottom 74 of the housing 72 are filled by gaskets 83.

Figure 5:
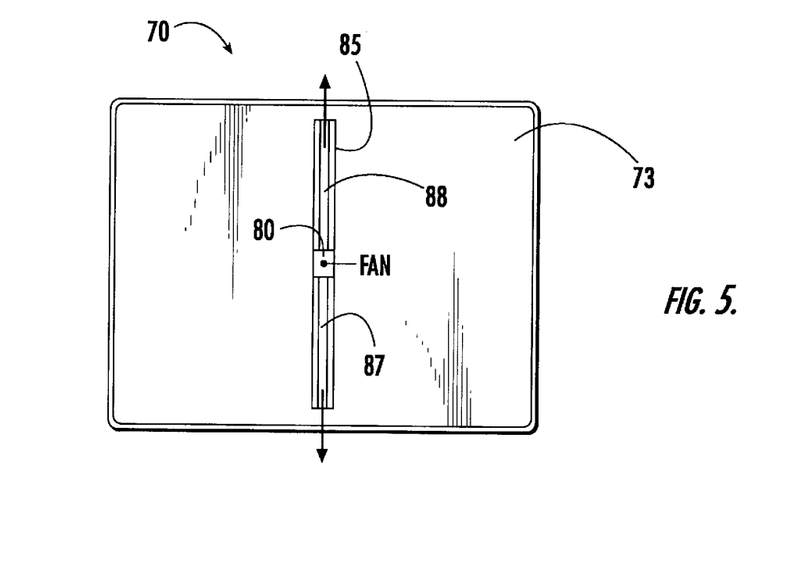
FIG. 5 is a top plan view of the battery of FIG. 4.
Figure 8:
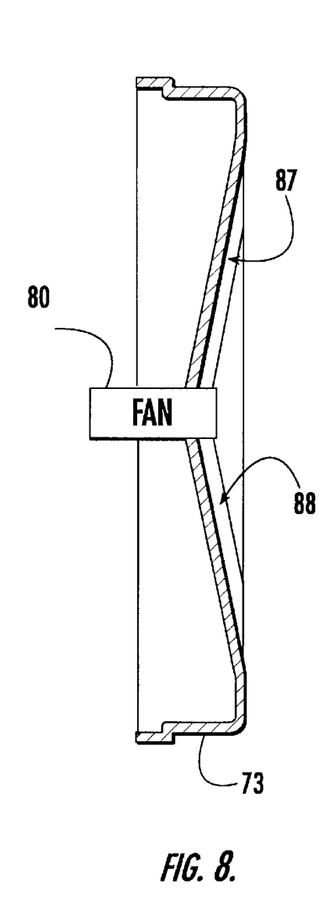
FIG. 8 is a side cross sectional view of the cover portion of the housing of the battery of FIG. 4, taken along line 8—8 of FIG. 6.

As best shown in FIGS. 5 and 8, the cover portion 7 3 of the housing 72 defines a central groove 85 which is deep at the center of the cover 73 and becomes more shallow as the groove approaches the opposite edges of the cover. The groove 85 parallels the flow axis of the fan 80. As shown in FIG. 8, a peripheral portion of the fan 80 protrudes into the groove at the center of the groove. A pair of elongate diffusion tubes 87 and 88 lie in the groove, one on each side of the fan, so that one end of each tube is ported to a position adjacent to the fan, with the tubes aligned with one another on opposite sides of the fan. The tubes extend upwardly along the groove in opposite directions away from the fan, and terminate with their other ends near the main surface of the cover 73.

Thus, the inner ends of the tubes 87, 88 lie next to the fan in the path of fan blades, facing one another through an outer sector of an active area of the fan. The tubes 87, 88 have a cross sectional area and length selected to substantially eliminate air flow into the housing when the fan is turned off, similar to the ventilation openings 25 of the first embodiment described above.

In the embodiment shown in FIGS. 4–8, the tubes each preferably have an inside diameter of about 3/16 inch (3 to 6 mm) and a length of about 7/8 inch (18 to 25 mm). However, any dimensions falling within the ranges and characteristics described above for the ventilation openings 25 may be utilized. Those skilled in the art will appreciate that the length of the passageways formed by the tubes 87, 88 may be increased, and/or the diameter decreased, if the static pressure of the fan is increased. A balance between the static pressure of the fan and the dimensions of the passageways can be found, at which air flow into the housing will be sufficiently reduced when the fan is turned off.

It should also be understood that the passageways provided by the tubes 87, 88 may be provided instead by openings molded into the cover 73, or by enclosing the groove 85.

Figure 6:
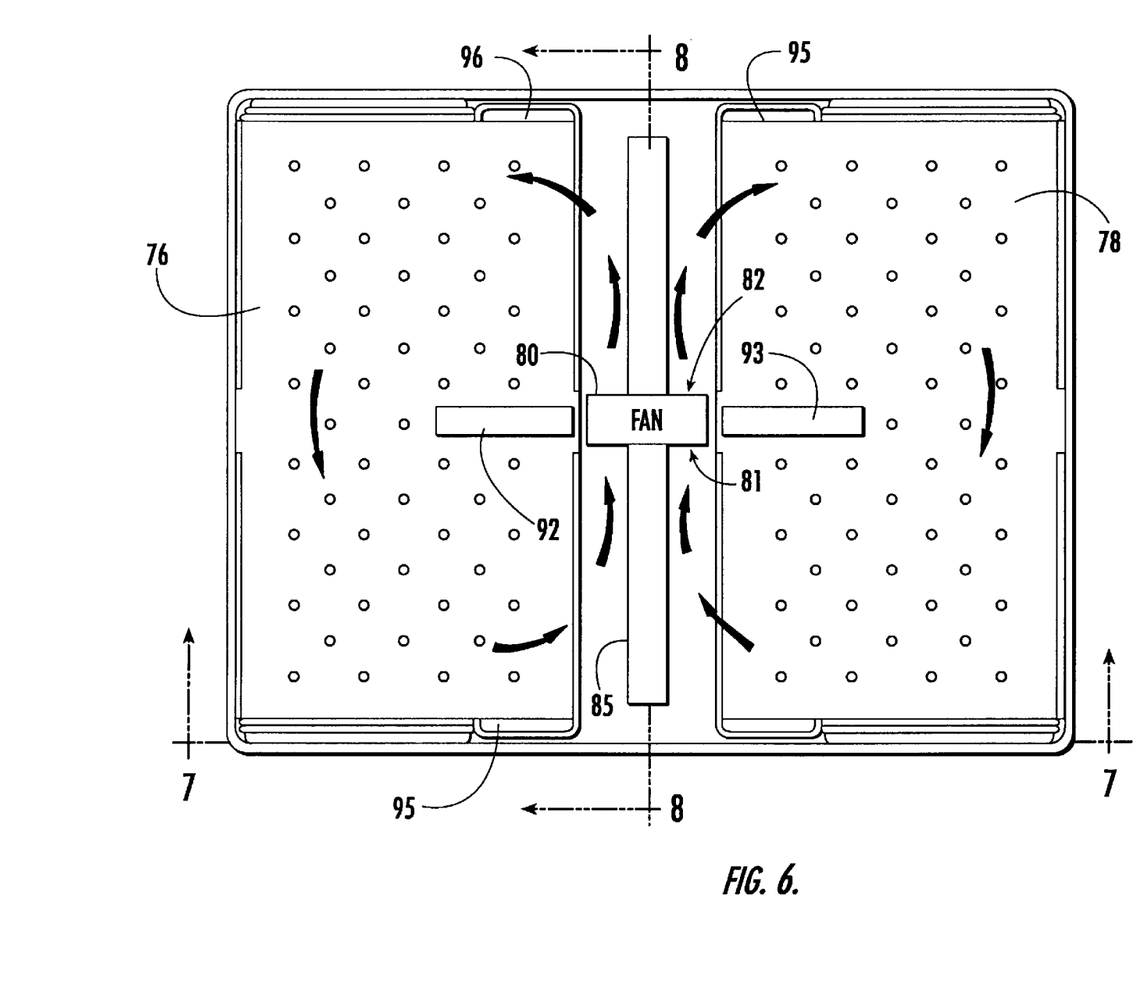
FIG. 6 is a top view of the interior of the battery of FIG. 4, taken along line 6—6 of FIG. 7.
Figure 7:
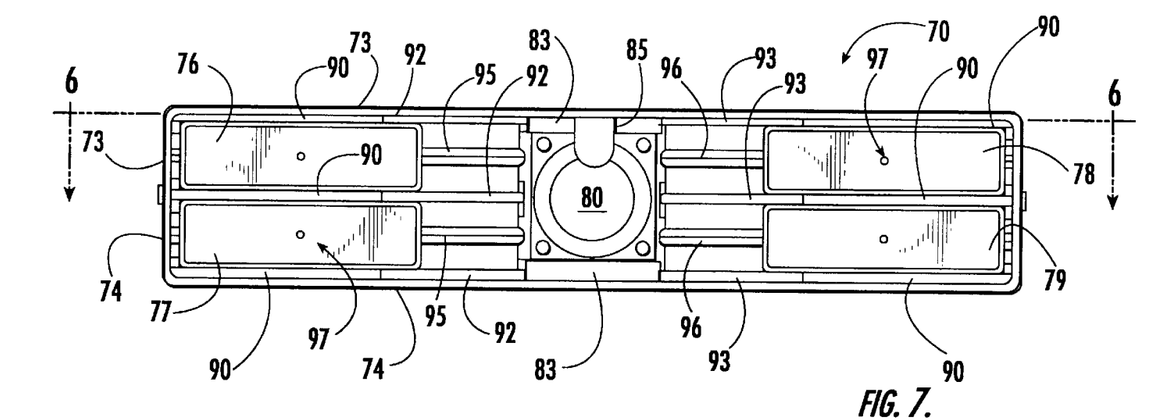
FIG. 7 is an end view of the interior of the battery of FIG. 4, taken along line 7—7 of FIG. 6.

The cells 76–79 may be dual air electrode cells of the type described in application Ser. No. 08/428,540, filed Apr. 24, 1995, which is incorporated herein by reference. Such cells have air cathodes adjacent to both surfaces of the cell, and zinc anodes between the cathodes. Each cell includes a cathode terminal tab 95 and an anode terminal tab 96, as shown in application Ser. No. 08/428,540 and a hydrogen vent 97 formed in the side of the cell. The cells 76–79 are spaced apart from each other in their stacks and also from the cover 73 and bottom 74 of the housing by a plurality of U-shaped peripheral gaskets 90 that extend around the periphery of the housing except for the central space between the cell stacks, and by central gaskets 92 and 93. The left central gaskets 92 extend from the fan over the cell 76, under the cell 77, and between the cells 76 and 77. The right central gaskets 93 extend from the fan over the cell 78, under the cell 79, and between the cells 78 and 79. The gaskets 92 and 93 extend from the fan about three-fifths of the width of the cells. The gaskets 90, 92 and 93 assure that space is provided for air flow adjacent to all the air cathodes of the cells, and also direct air flow in such spaces.

In operation, the fan circulates air along two separate air flow paths, at the same time, as shown by the two circles of arrows in FIGS. 4 and 6. The air pressurized on the positive side of the fan flows from the central space both left and right into the spaces between the cells of each stack, and between the cells and the housing. The central gaskets 92, 93 guide the air to the outer edge of the air cathodes, and the peripheral gaskets 90 confine the air to the area of the air cathodes. After passing the central gaskets, the air flows back around to the negative side of the fan for recirculation. New, or make up, air is admitted through the tube 87 on the negative side of the fan, while a similar amount of air is expelled through the tube 88 on the positive side of the fan.

The fan blades mix the incoming air with air within the housing, and force most of the incoming air into the recirculating air flow paths. Although the fan preferably is midway along the length of the cells, it may be positioned at any point along the space between the stacks from which the separate air flow paths may be maintained at the same time. While the fan is turned on, a flow of air occurs in the tubes 87, 88; but when the fan is turned off, the flow in the tubes is so small it does not result in significant discharge of the cells. As a result of the separate air flow paths, all cells of both stacks of cells receive air quickly, and the air received is of more uniform oxygen concentration because the air paths are shorter than in previous configurations utilizing the same number of cells. In other words, when the air flow reaches the last air electrode area prior to returning to the fan, the air has traversed a smaller cumulative air electrode area, and therefore is not as depleted of oxygen as was the case in prior systems.

The cells are wired together in series in a manner known to those skilled in the art. The fan is connected to be operated by the cells. A cable 99 extends from the housing to connect the cells and fan to recharge circuitry (not shown) and an upconverter (not shown). The upconverter raises the voltage output of the battery, for example about four volts, to the level needed to operate the fan, for example about ten volts.

Although the embodiment of FIGS. 4–8 has been described in connection with dual air electrode cells, it should be understood that this invention is advantageous in batteries of all types of metal-air cells. Furthermore, the number of cells on each side of the flow axis of the fan may be one, or may be as many as may be serviced adequately by the fan. Such cells may be stacked, as shown, or oriented in some other configuration.

Figure 9:
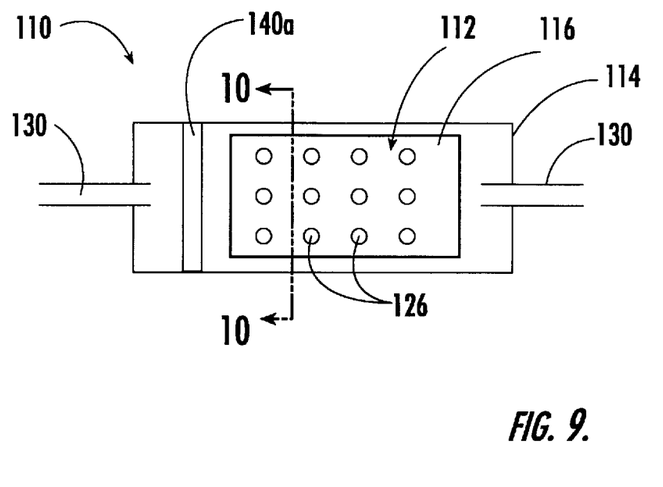
FIG. 9 is a side cross-sectional view of an alternative embodiment of a battery incorporating a micromachine air mover with circular metal-air cells.
Figure 10:
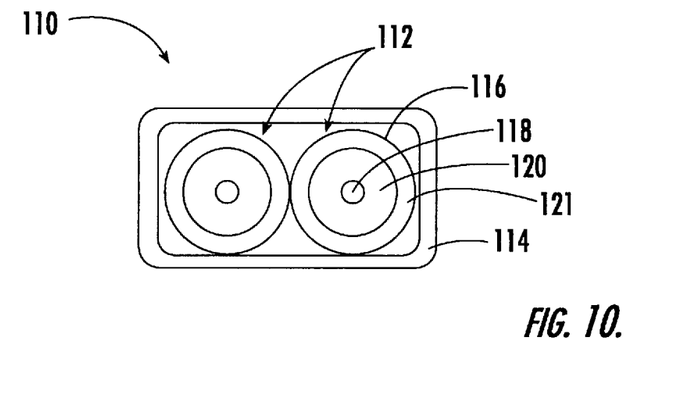
FIG. 10 is an end view of the interior of the battery of FIG. 9 taken along line 10—10.

The present invention also combines micromachine technology with air manager technology. As shown in FIG. 9, a battery 110 includes at least one metal-air cell 112 within a housing 114. Preferably, the battery 110 includes two cylindrical metal-air cells 112 as best shown in FIG. 10. FIG. 10 illustrates an end view of two cylindrical metal-air cells 112 taken along line 10—10 of FIG. 9. However, FIG. 11 illustrates an alternative embodiment of a battery 110a utilizing two prismatic metal-air cells 115 positioned with air cathodes 117 facing across a central passage 119 in place of the cylindrical metal-air cells 112.

The metal-air cells 112 each include a casing 116 that encloses a pair of rod-shaped cylindrical current collectors 118, a pair of metallic anodes 120, and a pair of oxygen electrodes 121. One of the oxygen electrodes 121 is configured substantially concentrically about one of the metallic anodes 120 and one of the metallic anodes 120 is configured substantially concentrically about one of the current collectors 118. The casing 116 includes a plurality of mask holes 126 for permitting air flow within the housing 114 to contact the oxygen electrodes 121.

Figure 11:
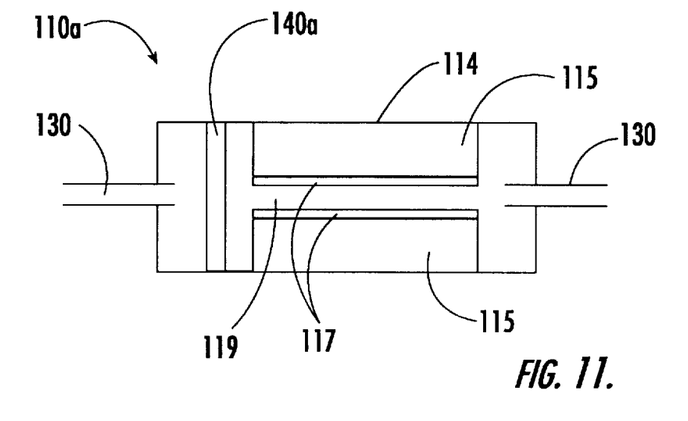
FIG. 11 is a side view of an alternative embodiment of a battery incorporating a micromachine air mover with prismatic metal-air cells.

As shown in each of FIGS. 9 and 11, the batteries 110 and 110a further include a pair of diffusion tubes 130 of the type described above. The diffusion tubes 130 are preferably extended through opposite walls of the housing 114. Between the two diffusion tubes 130 is a micromachine air mover 140a or 140b. Generally, the micromachine mover 140a or 140b is a pump typically created from bonded layers of etched silicon to form a three-dimensional structure with sealed cavities. The pump includes at least one deformable diaphragm that at least partially defines a pump chamber. The diaphragm vibrates to generate airflow into the pump chamber. By actuating the diaphragm, the volume of the pump chamber is intermittently varied and directional air flow is generated from the pump chamber across the metal-air cells.

Micromachine air movers are preferably sealed across the entire cross-section of the housing 114 as best shown in FIGS. 9 and 11. Micromachine air movers are more effectively utilized in devices characterized as blow-through devices which do not actively recirculate air within the housing.

Figure 12:
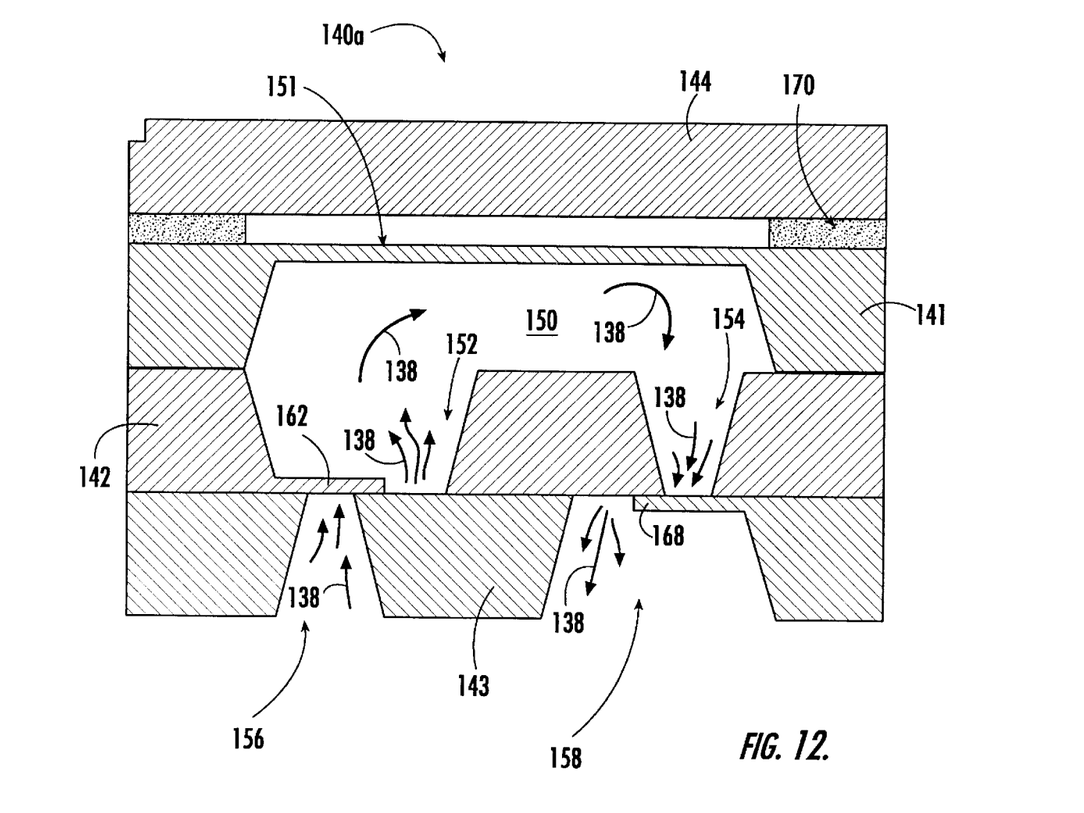
FIG. 12 is a cross-sectional view of one embodiment of an electrostatically-actuated diaphragm pump for generating air flow.

In particular, the micromachine air mover may be an electrostatically-actuated diaphragm pump 140a of the type shown in FIG. 12. The air passes through the pump 140a as shown by the directional arrows generally designated by the reference numeral 138. The electrostatically-actuated pump 140a is made of multiple layers of etched silicon, or other suitable materials, which are bonded together by methods known in the micromachine art such as silicon fusion bonding and anodic bonding. For example, a first layer 141 of etched silicon and a second layer 142 of etched silicon are bonded together to define a pump chamber 150 therebetween. Layer 141 includes a deformable diaphragm 151 which partially defines the pump chamber 150. Layer 142 includes a pair of openings 152 and 154. Bonded to layer 142 is a third layer 143 of etched silicon having an inlet 156 and an outlet 158.

The openings 152 and 154 are partially misaligned with the inlet 156 and outlet 158, respectively. The inlet 156 is obstructed by a check valve 162, a cantilever portion of the layer 142, extending over and covering the inlet 156. The opening 154 to the outlet 158 is obstructed by a check valve 168, a cantilever portion of the third layer 143, extending under and covering the opening 154. When the electrostatically-actuated pump 140a is not operating, the paths between the chamber 150 and the inlet 156 and outlet 158 are completely obstructed due to the check valves 162, 168.

A fourth layer 144 of etched silicon is connected to the first layer 141 by a peripheral spacing layer 170 therebetween. The spacing layer 170 is preferably made of Pyrex, or other suitable material, to form a gap between the diaphragm 151 and the fourth layer 144. The layer 144 acts as a counterelectrode to the diaphragm 151. During operation of the electrostatically-actuated pump 140a, a current is passed through the counterelectrode of layer 144 in a known manner which causes the diaphragm 151 to vibrate. By causing the diaphragm 151 to vibrate, the check valves 162, 168 are intermittently opened and closed.

The check valves 162, 168 vibrate at the same frequency that the diaphragm 151 vibrates. More particularly, alternating airflow is permitted through the inlet 156 and outlet 158. When the diaphragm 151 flexes upward, the pressure within the pump chamber 150 decreases, pulling open the check valve 162 to permit air into the pump chamber 150, while the check valve 168 is pushed closed to obstruct air from being expelled. On the other hand, when the diaphragm 151 flexes downward, the pressure within the pump chamber increases, pushing open the check valve 168 to expel air from the pump chamber 150, while pushing the check valve 162 closed to obstruct air from entering the pump chamber 150. The air flow generated depends upon the sizes of the openings 152 and 154, the size of the inlet 156 and outlet 158, the volume of the pump chamber 150, and the power sought to be provided by the battery, etc. The level of noise permitted to impact the environment as a result of the diaphragm's vibration is also a consideration.

Consequently, the volume of air flow generated by utilizing the electrostatically-actuated pump 140a depends on its size and efficiency. For example, a 4 mm by 4 mm electrostatic diaphragm, having a silicon thickness of 25 $\mu$m, and a gap of 4 $\mu$m between the counter electrode of layer 144 and the diaphragm 151, is capable of achieving actuation frequencies in the range of 1 to 100 Hz. At a frequency of 25 Hz, a flow rate of approximately 70 $\mu$l/min is achievable when outlet and inlet pressures are equal.

A duct (not shown) directs the flow of air from the outlet 158 to the side of the air pump 140a remote from the cell 112 as viewed in FIG. 1. It will seen that the net flow created by the pump 140b will cause a flow from one diffusion tube 130 across the cell 112 to the other diffusion tube at the other end of the housing 114.

Figure 13:
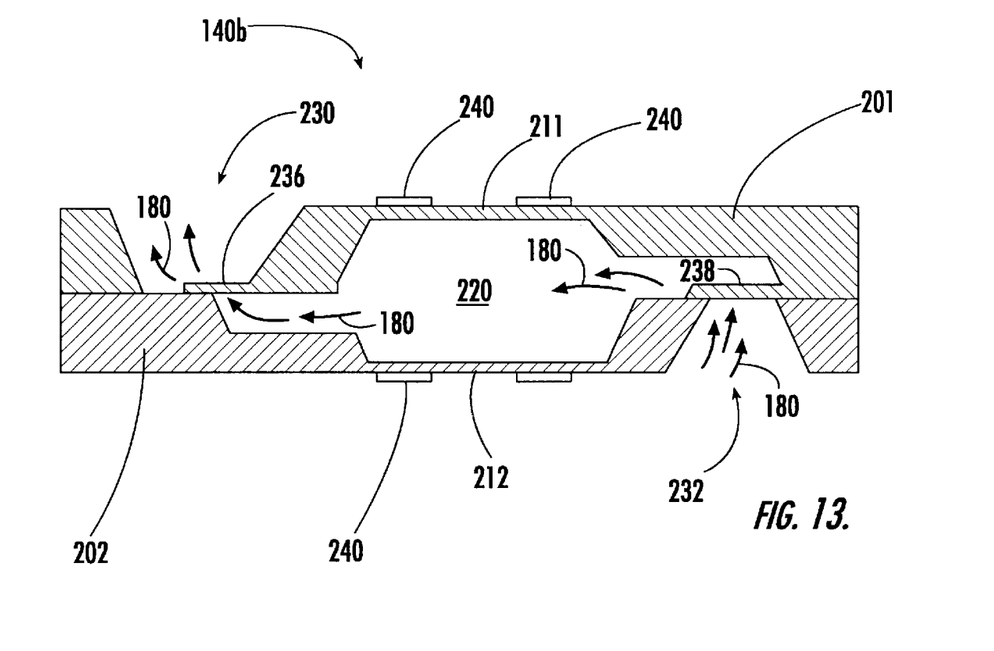
FIG. 13 is a cross-sectional view of one embodiment of a thermoelectrically-actuated diaphragm pump for generating air flow.
Figure 14:
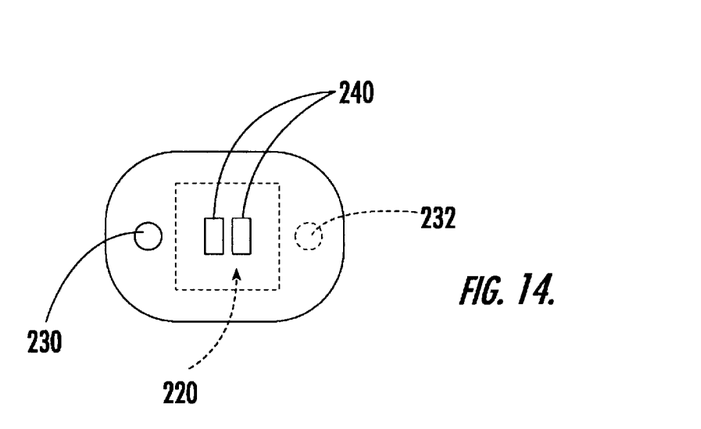
FIG. 14 is a top view of the thermoelectrically-actuated diaphragm pump of FIG. 13.

Alternatively, the micromachine air mover may be a thermoelectrically-actuated diaphragm pump 140b of the type shown in FIGS. 13 and 14. The air circulates through the pump 140b as shown by the directional arrows generally designated by the reference numeral 180. The thermoelectrically-actuated pump 140b is formed from a pair of etched silicon layers 201 and 202 bonded together. Layers 201 and 202 each include a diaphragm 211 and 212, respectively, to define a pump chamber 220 therebetween. Layer 201 includes an inlet 232 and the second layer 202 includes an outlet 230 which are on opposite sides of the pump 140b. The inlet 232 permits air flow into the pump chamber 220 and the outlet 230 expels air flow from the pump chamber 220 when the pump 140b is operating. When the pump 140b is not operating, a check valve 238 on the first layer 201 obstructs the airflow through the inlet 232 and a second check valve 236 also on the first layer 201 obstructs the airflow from the pump chamber 220.

On the exterior surface of each diaphragm 211 and 212, opposite the pump chamber 220, is a pair of thermoelectric actuators 240. The thermoelectric actuators 240 are deposited on the diaphragms 211, 212 in a manner well known in the micromachine art. The thermoelectric actuators 240 are preferably aluminum. It is necessary for the layers 201, 202 and the thermoelectric actuators 240 to be made of dissimilar materials.

The thermoelectric actuators 240 are connected in parallel to a control circuit (not shown). Because the layers 201, 202 and the thermoelectric actuators 240 are made of dissimilar materials, the difference in thermal expansion causes the diaphragms 211, 212 to vibrate when current is applied. By causing the diaphragms 211, 212 to vibrate, the check valves 236, 238 are intermittently opened and closed. More particularly, the volume of the pump chamber 220 intermittently changes and alternating airflow is permitted through the inlet 232 and outlet 230.

The frequencies of the vibrating check valves 236, 238 correspond with the frequencies of the vibrating diaphragms 211, 212, respectively. When the diaphragms 211 and 212 flex inward, the pressure within the pump chamber 220 increases, the check valve 236 permits air to exit the pump chamber 220, and the check valve 238 obstructs air from entering the chamber. On the other hand, when the diaphragms 211 and 212 flex outward, the pressure within the pump chamber 220 decreases, the check valve 238 allows air to be drawn into the pump chamber 220, and the check valve 236 blocks the outlet 230.

It will seen that the net flow created by the pump 140b will cause a flow as viewed in FIG. 9 from one diffusion tube 130 across the cell 112 to the other diffusion tube at the other end of the housing 114.

Figure 15:
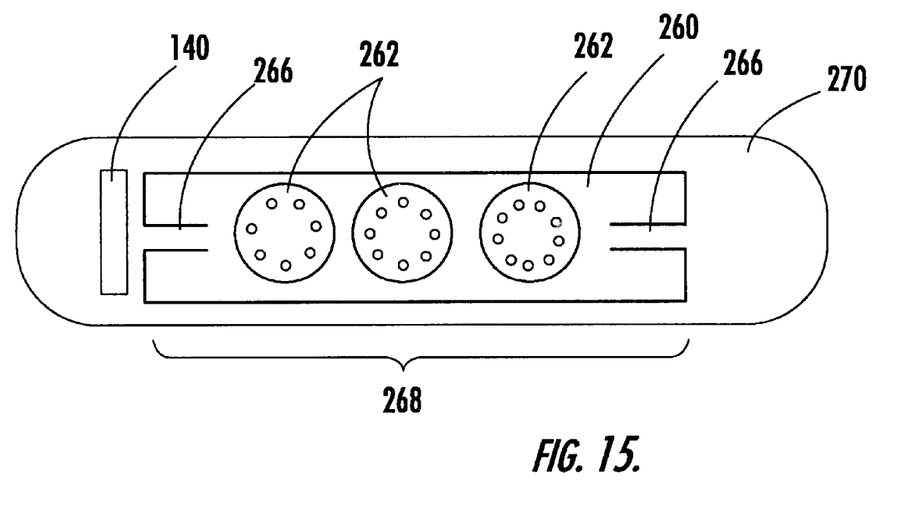
FIG. 15 is an alternative embodiment of the present invention having a housing of metal-air cells detachably secured to a metal-air battery receiving assembly containing a micromachine air mover.

FIG. 15 illustrates another alternative embodiment of the present invention utilizing a micromachine air mover 140. In FIG. 15, a housing 260 includes three metal-air cells 262. Preferably, the metal-air cells 262 are button metal-air cells. The housing 260 isolates the metal-air cells 262 from the ambient atmosphere except for a pair of diffusion tubes 266 of the type described above. The diffusion tubes 266 are aligned with one another and extend inwardly from opposite ends of the 35 housing 260. The housing 260, metal-air cells 262, and diffusion tubes 266 combine to form a metal-air battery pack 268. The metal-air battery pack 268 is detachably secured in a metal-air battery receptacle 270. The metal-air battery receptacle 270 may be a battery receptacle of any type of portable electronic device, such as a cellular phone, which requires periodic replacement of its battery power supply.

The metal-air battery receptacle 270 includes a micromachine air mover 140 of either type described above. It is important to note that the micromachine air mover 140 is placed outside of the housing 260. Gaskets and a cover (not shown) associated with the receptacle are positioned to block air flow that would bypass the flow path through the housing 260. When removing the metal-air battery pack 268 from the metal-air battery receptacle 270, the micromachine air mover 140 may remain permanently attached to the metal-air battery receptacle 270. When the metal-air cells 262 need replaced, a new metal-air battery pack 268 is inserted into the receptacle 270.

Although the latter embodiments described above have been described in connection with either electrostatically-actuated or thermoelectrically-actuated micromachines, it should be understood that this invention is advantageous with all types of micromachines capable of generating airflow. Other common microactuation methods include thermopneumatic, shape memory alloy, piezoelectric and magnetic methods which are used in conjunction with deformable microstructures.

It should be understood that the foregoing relates only to preferred embodiments of the present invention, and that numerous changes may be made therein without departing from the spirit and scope of the invention as defined by the following claims.

What is claimed is:

1. A ventilation system for an enclosure, comprising:
   an air moving device; and
   at least one elongate passageway that at least partially defines a communication path operable for communicating between a source of gas and the enclosure, wherein said passageway is operative to supply air flow through said passageway to the enclosure in response to operation of said air moving device, and said passageway is operative to restrict air flow through said passageway while said passageway is unsealed and said air moving device is not operating.

2. The ventilation system of claim 1, wherein the dimensional ratio of length to width of said passageway is greater than 2:1.

3. The ventilation system of claim 2, wherein the dimensional ratio of length to width of said passageway is greater than 10:1.

4. The ventilation system of claim 1, wherein the ratio of flow through said passageway when the air moving device is operating to when the air moving device is not operating is at least 100:1.

5. The ventilation system of claim 1, wherein said passageway is unobstructed.

6. A ventilation system for an enclosure, comprising:
   an air moving device;
   at least one elongate inlet passageway in communication with the enclosure; and
   at least one elongate outlet passageway in communication with the enclosure,
   wherein air flows through the passageways while the air moving device is operating, so that air is supplied to the enclosure via the at least one inlet passageway while the air moving device is operating, and wherein the passageways are operative to restrict air flow through the passageways while the passageways are unobstructed and the air moving device is not operating.

7. The ventilation system of claim 6, wherein the dimensional ratio of length to width of each of the passageways is greater than 2:1.

8. The ventilation system of claim 6, wherein the passageways are operative so that diffusion of air through the passageways is substantially eliminated while the passageways are unobstructed and the air moving device is not operating.

9. The ventilation system of claim 6, wherein the passageways are sufficiently long and narrow to provide a barrier to diffusion of gasses therethrough while the passageways are unobstructed and the air moving device is not operating.

10. The ventilation system of claim 6, wherein the air moving device is positioned in the enclosure.

11. The ventilation system of claim 6, wherein the enclosure is substantially air-tight.

12. The ventilation system of claim 6, wherein the air moving device is a fan.

13. A ventilation system for an enclosure, comprising:
   an air moving device;
   at least one inlet passageway in communication with the enclosure; and
   at least one outlet passageway in communication with the enclosure,
   wherein air flows through the passageways while the air moving device is operating, so that air is supplied to the enclosure via the at least one inlet passageway while the air moving device is operating, and wherein the passageways are sized to substantially eliminate air flow through the passageways while the passageways are unobstructed and the air moving device is not operating.

14. The ventilation system of claim 13, wherein the dimensional ratio of length to width of each of the passageways is greater than 2:1.

15. The ventilation system of claim 13, wherein the passageways are operative so that diffusion of air through the passageways is substantially eliminated while the passageways are unobstructed and the air moving device is not operating.

16. The ventilation system of claim 13, wherein the passageways are sufficiently long and narrow to provide a barrier to diffusion of gasses therethrough while the passageways are unobstructed and the air moving device is not operating.

17. The ventilation system of claim 13, wherein the air moving device is positioned in the enclosure.

18. The ventilation system of claim 13, wherein the enclosure is substantially air-tight.

19. The ventilation system of claim 13, wherein the air moving device is a fan.

* * * * *

UNITED STATES PATENT AND TRADEMARK OFFICE
CERTIFICATE OF CORRECTION

PATENT NO.      : 6,361,294 B1
DATED           : March 26, 2002
INVENTOR(S)     : Witzigreuter et al.

It is certified that error appears in the above-identified patent and that said Letters Patent is hereby corrected as shown below:

Title page,
Item [73], Assignee, "Air Energy Resources Inc." should read -- AER Energy Resources, Inc. --.

Item [56], References Cited, FOREIGN PATENT DOCUMENTS, "6/1996" should read -- 6/1998 --.

Signed and Sealed this

Twenty-second Day of October, 2002

Attest:

Attesting Officer

JAMES E. ROGAN
*Director of the United States Patent and Trademark Office*